United States Patent [19]
Itakura et al.

[11] Patent Number: 6,146,145
[45] Date of Patent: Nov. 14, 2000

[54] METHOD OF COLOR-MATCHING POWDER COATING AND COATING METHOD USING COLOR-MATCHED POWDER COATING

[75] Inventors: Takayuki Itakura; Norio Horikami, both of Osaka, Japan

[73] Assignee: Kyocera Mita Corporation, Osaka, Japan

[21] Appl. No.: 09/287,131

[22] Filed: Apr. 7, 1999

[30] Foreign Application Priority Data

Apr. 7, 1998 [JP] Japan ................................. 10-094741

[51] Int. Cl.7 .............................. G09B 25/08; C08K 5/00
[52] U.S. Cl. ................................ 434/93; 434/81; 106/493
[58] Field of Search ................................ 434/81, 84, 88, 434/93; 106/31.64, 493, 496, 497, 498, 499

[56] References Cited

U.S. PATENT DOCUMENTS

| | | |
|---|---|---|
| 2,238,483 | 4/1941 | Yule . |
| 4,211,016 | 7/1980 | Eldar . |
| 4,299,165 | 11/1981 | Nichols et al. ........................ 101/150 |
| 4,523,852 | 6/1985 | Bauer ...................................... 356/421 |
| 4,796,888 | 1/1989 | Louez ........................................ 273/58 |
| 5,174,758 | 12/1992 | Abramson ................................ 434/98 |
| 5,797,750 | 8/1998 | Gouriou et al. ....................... 434/100 |

*Primary Examiner*—Sam Rimell
*Assistant Examiner*—Bena B. Miller
*Attorney, Agent, or Firm*—Smith Gambrell & Russell, LLP

[57] ABSTRACT

A method of blending a light-transmittable powder coating which is colored in at least one color and a colorless light-transmittable powder coating which is not colored, and dryblending the powder coatings, to color-match the powder coatings, capable of reproducing colors which could not be reproduced in conventional powder coatings, for example, light colors, transparent colors, or brilliant colors.

6 Claims, 2 Drawing Sheets

F I G. 1
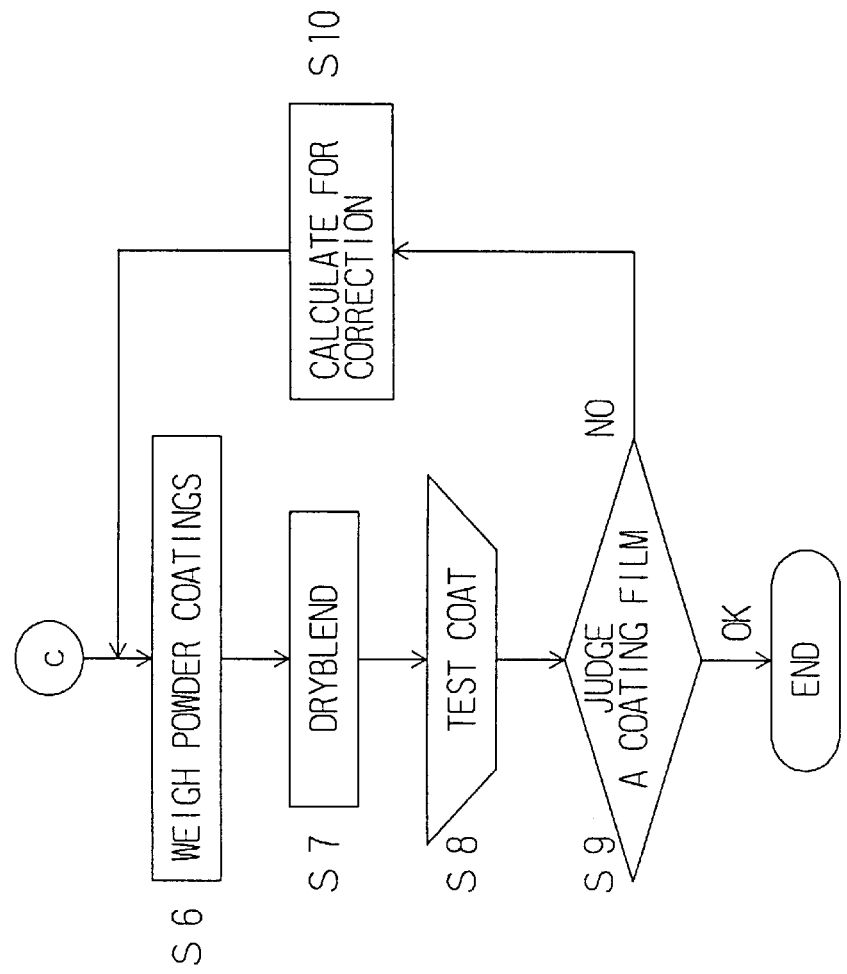
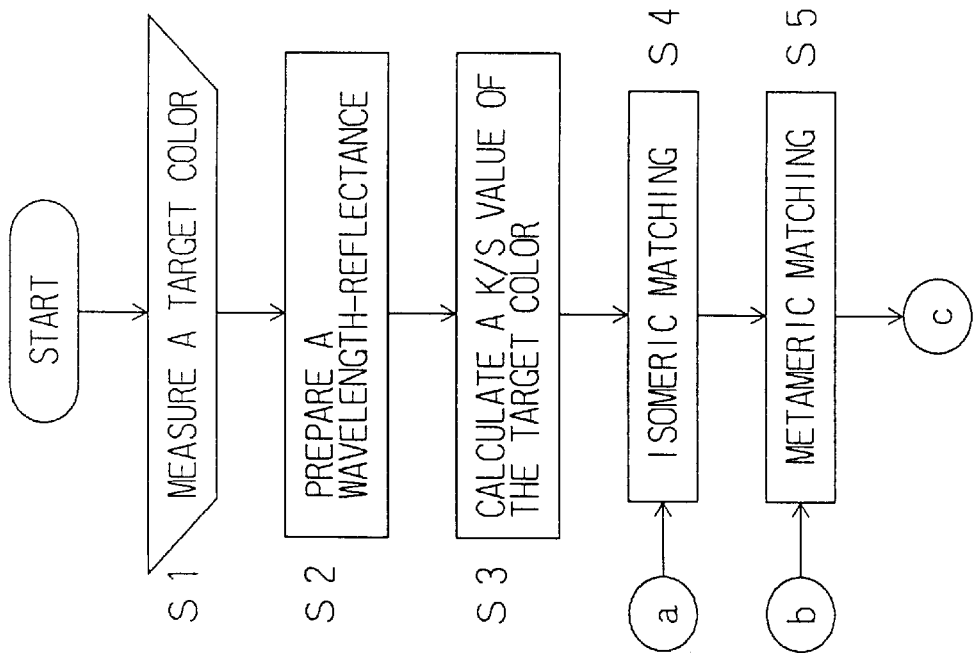

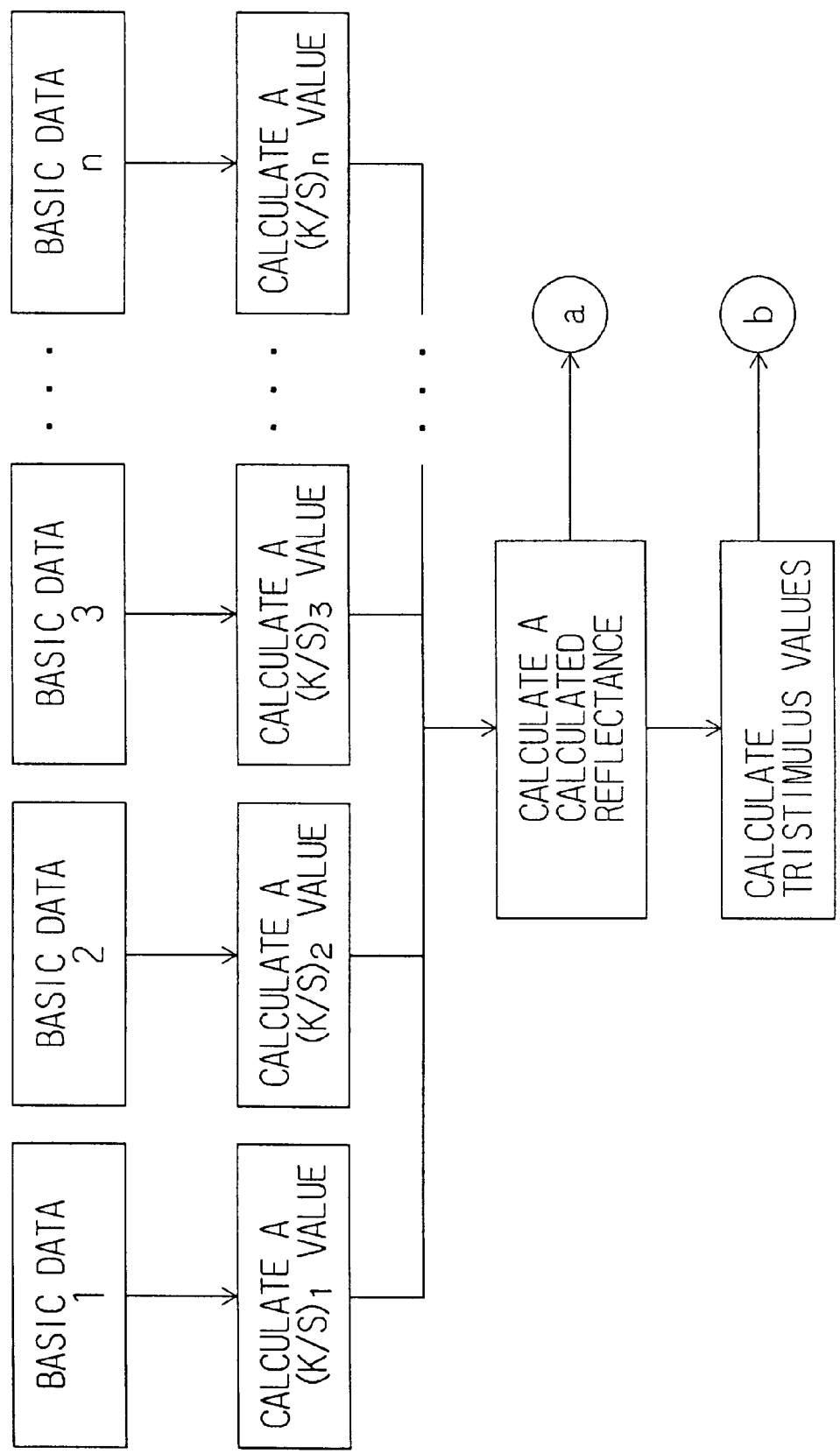

METHOD OF COLOR-MATCHING POWDER COATING AND COATING METHOD USING COLOR-MATCHED POWDER COATING

BACKGROUND OF THE INVENTION

1. Field of the Invention

The present invention relates to a method of blending light-transmittable powder coatings in a plurality of colors to color-match the powder coating, and a coating method using powder coatings color-matched by such a color-matching method.

2. Description of the Prior Art

In recent years, a powder coating which is high in safety because it is applied without using a solvent but using air as a medium and hardly affects the environment has been spreading in the field of household electrical appliances, for example. A powder coating is generally produced by blending a coloring agent and other additives with a binder resin which forms the basis of powder, welding and kneading a mixture obtained, and then grinding and classifying the mixture.

A powder coating which is charged to a predetermined polarity by friction or corona discharge, for example, is made to electrostatically adhere on the surface of a material to be coated which is grounded, and is then welded by heating, or a material to be coated which is preheated is inserted into a powder coating which is suspended or caused to flow in an air current, to weld the powder coating or cause the powder coating to flow onto the surface of the material to be coated utilizing the preheating, thereby forming a continuous coating film on the surface of the material to be coated.

The powder coating has been widely spreading in the field of coating of so-called large lots in which coatings in the same color are consumed in large amounts, for example, the above-mentioned household electrical appliances. On the other hand, it has hardly spread in the fields such as the field of coating of small lots in which coatings in many colors are respectively required in small amounts and the field of coating in which subtle adjustment of color appearance is required after color-matching. In the present conditions, the rate of the spread of the powder coating is lower than that of a conventional coating using a solvent.

One of the causes is the fact that a method of producing the conventional powder coating is not suitable for production of small lots, and makes it impossible to simply adjust color appearance as in the coating using a solvent.

That is, the conventional powder coating is previously produced in a state where it is color-matched to a predetermined color by adding a coloring agent color-matched in conformity to a target color to the binder resin which forms the basis of powder.

Therefore, the conventional powder coating is suitable for coating of large lots in which coatings in the same color are required in large amounts but is not suitable for coating of small lots in which coatings in a predetermined color are required in very small amounts, and color appearance cannot be simply adjusted.

In order to solve such problems to simply cope with coating of small lots and fine adjustment of color appearance, consideration has been given to a method of blending powder coatings in a plurality of colors previously color-matched to so-called three primary colors, i.e., cyan (C), magenta (M) and yellow (Y), for example, and particularly light-transmittable powder coatings colored in the respective colors in conformity to a target color, and dry-blending the powder coatings using a mixer such as a rotary vane type mixer, to obtain a powder coating having a predetermined color by mixing the colors.

When the above-mentioned color-matching method is actually carried out, however, it is revealed that colors which can be reproduced are limited, and particularly light colors, transparent colors, or brilliant colors cannot be reproduced.

SUMMARY OF THE INVENTION

A primary object of the present invention is to provide a new method of color-matching powder coatings, in which a broad range of colors can be reproduced, and particularly colors which could not be conventionally reproduced, for example, light colors, transparent colors or brilliant colors can be reproduced.

Another object of the present invention is to provide a coating method in which a superior coating film which is uniform in color development and superior in color reproducibility and has a smooth surface can be formed using powder coatings color-matched by such a color-matching method.

In order to solve the above-mentioned problems, the inventors have found, as a result of various considerations, that many colors which could not be conventionally reproduced, for example, light colors, transparent colors or brilliant colors can be easily reproduced only by further adding a colorless light-transmittable powder coating containing no coloring agent to colored light-transmittable powder coatings in a plurality of colors which are colored by coloring agents, that is, increasing the type of powder coating by one, to complete the present invention.

Specifically, a color-matching method according to the present invention is characterized by blending powder coatings in a plurality of colors, and dryblending the powder coatings using a mixer, to produce a color-matched powder coating, wherein at least any one of colored light-transmittable powder coatings which are colored by a coloring agent, and a colorless light-transmittable powder coating containing no coloring agent are used as said powder coatings.

A coating method according to the present invention is characterized by first positively charging a powder coating for forming an undercoating film using a triboelectrification gun, to make the powder coating electrostatically adhere on the surface of a material to be coated, then negatively charging a powder coating for forming a finish coating film, which is color-matched by the color-matching method according to the present invention, using a corona electrification gun, to make the powder coating electrostatically adhere thereon, and then welding the whole by heating, to form a coating film having a structure in which the undercoating film and the finish coating film are laminated on the material to be coated.

According to the coating method in the present invention, in order to form the finish coating film which is superior in color reproducibility using the light-transmittable powder coatings which are color-matched by the color-matching method according to the present invention, a coating film having a two-layer structure which is combined with a white undercoating film having covering properties, for example, can be formed so as to have a smooth surface and develop a uniform color having no spots by a two coat and one bake method which is superior in production efficiency and fabrication cost.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a flow chart showing the respective steps of an example of a color-matching method according to the present invention; and FIG. 2 is a flow chart showing the steps of calculating calculated reflectance and tristimulus values from a plurality of basic data obtained by previously measuring the colors of powder coatings in a plurality of colors which are used in the color-matching method.

DETAILED DESCRIPTION OF THE INVENTION

The present invention will be described.

In a color-matching method according to the present invention, colored light-transmittable powder coatings in a plurality of colors which are colored using coloring agents and a colorless light-transmittable powder coating containing no coloring agent are used, as described above.

Examples of the colored powder coatings include powder coatings in three colors, i.e., cyan (C), magenta (M), and yellow (Y) as described above, and particularly powder coatings in three colors, i.e., cyan (C), red (R) added in place of magenta (M) in order to reproduce an orangish color, and yellow (Y).

Alternatively, in order to reproduce color tone more finely and prevent a coating film from giving appearance of grain, powder coatings in five colors (three colors, i.e., C, M and Y plus two colors, i.e., light cyan (LC) and light magenta (LM)), powder coatings in five colors (three colors, i.e., C, R and Y plus two colors, i.e., light cyan (LC) and light red (LR)), and so forth can be also employed.

Such a colored powder coating is produced by welding and kneading using a jet mill, a Banbury mixer, a roll, a uniaxial or biaxial extruding kneader, and so forth a mixture obtained by preliminarily blending a transparent binder resin, a coloring agent such as a pigment, and the other additives as required, for example, using a dry-blender, a Henschel mixer, a ball mill, and so forth, and then cooling and grinding a kneaded mixture obtained, and further classifying the mixture as required.

A colorless (T) powder coating is produced in the same manner as described above except that no coloring agent is added. The above-mentioned powder coatings are preferably formed of binder resins which are superior in compatibility with each other and more preferably formed of the same binder resin when it is considered that they are easily dryblended or they are uniformly welded and integrated when they are baked to form a coating film, to make the coating film continuously uniform.

When the powder coatings color-matched by the dry-blending are made to electrostatically adhere on the surface of a material to be coated which is grounded in a state where they are charged as described above, for example, it is preferable that the chargeabilities of the powder coatings in the respective colors are previously matched with each other such that the chargeability of the whole of the powder coatings in the respective colors do not vary by variations in the blending ratio of the powder coatings.

A color-matching method according to the present invention using light-transmittable powder coatings in a plurality of colors, including a colorless powder coating, for example, the four colors C, M, Y and T or the four colors C, R, Y and T can be also carried out by hand, relying on knowledge, experience, and intuition of a worker, similarly to the conventional color-matching method. However, it is preferably carried out using an automatic color-matching system of powder coatings for automatically performing processing from measurement of a color which is a target for color-matching to blending and color-matching of powder coatings in respective colors, as shown in FIG. 1, for example.

According to such an automatic color-matching system, the results of the color-matching may not vary due to intrinsic factors such as the degree of skill, a state of health, or a state of mind or extrinsic factors such as the type of color to be matched (for example, a very light color) and environmental conditions at the time of color-matching working (season, weather, time, a state of light rays, and others) which affect the worker at the time of the color-matching work.

In such an automatic color-matching system, a color sample of a target color, for example, is first measured using a color measuring machine such as a spectrophotometer [step S1].

A wavelength-reflectance curve is then prepared from the results of the measurement [step S2], and a K/S value which is the ratio of an absorption coefficient K to a scattering coefficient S of light in a wavelengh for each predetermined spacing (for example, 20 nm) is calculated on the basis of a rule of Kubelka-Munk [step S3].

Isomeric matching is then performed using the K/S value and calculated reflectance calculated from K/S values $[(K/S)_1$ to $(K/S)_n]$ of a plurality of basic data 1 to n obtained by previously measuring the colors of powder coatings in a plurality of colors which are used upon adjusting the blending ratio of each of the powder coatings to a colorless powder coating to change the strength of color of a coating film, as shown in FIG. 2, to match spectral reflectance curves [step S4], and metameric matching is then performed using the results of the isomeric matching and tristimulus values calculated from the calculated reflectance to match the tristimulus values, thereby calculating the blending ratio of the powder coatings in the respective colors [step S5].

The powder coating in each of the colors is then weighed using a weighing machine on the basis of the results of the calculation [step S6], and is dryblended upon being supplied to a mixer [step S7].

The dryblended powder coating is test coated under the same conditions as the actual coating [step S8], and the color thereof is then measured using the above-mentioned color measuring machine. Data obtained by measuring the color is compared with data obtained by first measuring the target color, to judge the presence or absence of a delicate difference of color appearance [step S9].

When there is a delicate difference of color appearance in the judgment, the blending ratio of the powder coatings in the respective colors is calculated for correction, on the basis of both the data obtained by measuring the colors [step S10]. The steps S6 to S9 are repeated again on the basis of the results thereof.

In the judgment at the step S9, at the time point where there is no delicate difference of color appearance between the color of the coating film and the target color, the color-matching of the powder coatings is completed.

A color difference $\Delta E^*$ between the data obtained by measuring the target color and the data obtained by measuring the color of the coating film, for example, is employed as the basis for judgment of the presence or absence of the delicate difference of color appearance at the foregoing step S9. Specifically, it may be judged that there is no delicate difference of color appearance when the color difference ΔE* between the data obtained by measuring the target color and the data obtained by measuring the color of the coating film is not more than a previously set threshold value, while there is a delicate difference of color appearance when it exceeds the threshold value. he threshold value is not limited to the same. For example, approximately 0.8 is preferable as the threshold value of the color difference ΔE*.

When the dryblending is insufficient at the step S7 in the above-mentioned color-matching method, an aggregate of the powder coatings in the respective colors cannot be sufficiently pulverized. On the other hand, when the dryblending is excessive, the powder coatings rather aggregate by the aggregate. In either case, therefore, the appearance of grain given to the coating film is so large as to be visible, which may result in inferiority such as color segregation, mottled appearance, or strength of color.

Therefore, the most suitable time required for the dry-blending must be set. As the basis for the setting, the above-mentioned color difference ΔE* is suitably employed. That is:

(i) Samples of powder coatings used for color-matching are previously dryblended using the mixer prior to the color-matching, while hue in a powder state of the samples which are being dryblended is measured for each predetermined time using the color measuring machine. Time for the dryblending required until a color difference ΔE* between a value obtained by most newly measuring the hue and a value obtained by previously measuring the hue reaches not more than a threshold value (preferably, not more than 0.8) is measured, and time required for dry-blending of the actual powder coatings is set on the basis of the data. Alternatively, (ii) Actual powder coatings which are being dryblended using the mixer are sampled for each predetermined time, to measure hue in a powder state of the powder coatings using the color measuring machine, thereby terminating the dryblending at the time point where a color difference ΔE*between a value obtained by most newly measuring the hue and a value obtained by previously measuring the hue reaches not more than a threshold value (preferably, not more than 0.8).

Consequently, it is possible to produce satisfactorily dry-blended powder coatings without causing inferiority such as color segregation, mottled appearance or strength of color.

Although not limitative, the following are respective components constituting the powder coatings in the plurality of colors, including the colorless powder coating, which are used for the color-matching method according to the present invention:

Binder Resin

As the binder resin, it is possible to use, out of various types of conventionally known resins which are used for the powder coating, various types of resins which are superior in light-transmittable properties and can form a continuous coating film upon being welded by heating at the time of application or after application on a material to be coated in order to give light-transmittable properties to the powder coating.

Although not limitative, the following are examples of such binder resins:

styrene resins (a homopolymer or a copolymer containing styrene or styrene substitute) such as polystyrene, chloropolystyrene, poly-α-methylstyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic ester copolymer (styrene-methyl acrylate copolymer, styrene-ethyl acrylate copolymer, styrene-butyl acrylate copolymer, styrene-octyl acrylate copolymer, styrene-phenyl acrylate copolymer, etc.), styrene-methacrylic ester copolymer (styrene-methyl methacrylate copolymer, styrene-ethyl methacrylate copolymer, styrene-butyl methacrylate copolymer, styrene-phenyl methacrylate copolymer, etc.), styrene-a-methyl chloracrylate copolymer, and styrene-acrylonitrile-acrylic ester copolymer, acrylic resins [a homopolymer or a copolymer mainly composed of (meta) acrylic acid and its ester] such as acrylic acid, methyl acrylate, ethyl acrylate, butyl acrylate, octyl acrylate, phenyl acrylate, methacrylic acid, methyl methacrylate, ethyl methacrylate, butyl methacrylate, phenyl methacrylate, and α-methyl chloracrylate, polyvinyl chloride, low-molecular weight polyethylene, low-molecular weight polypropylene, ethylene-ethyl acrylate copolymer, polyvinyl butyral, ethylene-vinyl acetate copolymer, polyester resin, epoxy resin, and silicone resin. They are used alone or in combination of plural types.

Particularly suitable binder resins out of the foregoing are styrene resin, acrylic resin, and polyester resin. The most suitable one of the resins is polyester resin obtained by copolycondensing the following components and having a value of OHV/AV, which is the ratio of a hydroxyl value (OHV) to an acid value (AV), of not less than 1.2:

(i) diol expressed by the following general formula (1):

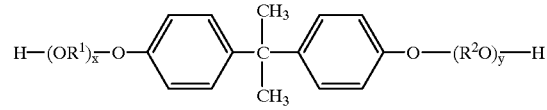

(1)

[wherein $R^1$ and $R^2$ are the same or different and indicate a lower alkylene group, x and y indicate identical or different integers of 0, or not less than 1, and x+y is 1 to 7]

(ii) dicarboxylic acid, its acid anhydride or lower alkyl ester, and (iii) polycarboxylic acid having three or more carboxyl groups, its acid anhydride or lower alkyl ester, or polyhydric alcohol having three or more hydroxyl groups.

In the above-mentioned polyester resin, examples of the lower alkylene group corresponding to $R^1$ and $R^2$ in the general formula (1) include an alkylene group having one to six carbon atoms such as methylene, ethylene, trimethylene, propylene, tetramethylene, ethylethylene, pentamethylene, and hexamethylene.

In the general formula (1), x+y is 1 to 7, as described above, and preferably 3 to 5. When x+y exceeds 7, the molecular weight of the diol is too high, so that the light-transmittable properties of the coating film are reduced.

Examples of the diol expressed by the general formula (1) include polyoxypropylene(2.2)-2,2-bis(4-hydroxyphenyl) propane, polyoxypropylene(3.3)-2,2-bis(4-hydroxyphenyl) propane, polyoxyethylene(2.0)-2,2-bis(4-hydroxyphenyl) propane, polyoxypropylene(2)-polyoxyethylene(2)-2,2-bis (4-hydroxyphenyl)propane, and polyoxypropylene(6.0)-2,2-bis(4-hydroxyphenyl)propane.

Examples of the dicarboxylic acid include oxalic acid, malonic acid, succinic acid, itaconic acid, glutaconic acid, adipic acid, maleic acid, fumaric acid, citraconic acid, mesaconic acid, azelaic acid, sebacic acid, cyclohexanedicarboxylic acid, phthalic acid, isophthalic acid, terephthalic acid, anhydrides of these acids, and lower alkyl ester of these acids. Examples of the lower alkyl include an alkyl group having one to six carbon atoms such as methyl, ethyl, n-propyl, isopropyl, n-butyl, isobutyl, s-butyl, t-butyl, n-pentyl, and n-hexyl.

The polycarboxylic acid having three or more carboxyl groups, its acid anhydride or lower alkyl ester, or the polyhydric alcohol having three or more hydroxyl groups is blended for the purpose of adjusting the acid value and the hydroxyl value of the polyester resin and branching the polyester resin.

Examples of the polycarboxylic acid having three or more carboxyl groups include trimellitic acid, 2,5,7-naphthalene tricarboxylic acid, 1,2,4-naphthalene tricarboxylic acid, 1,2,4-butane tricarboxylic acid, 1,3-dicarboxyl-2-methyl-2-methoxycarbonyl propane, tetra(methoxycarbonyl)methane, 1,2,7,8-octane tetracarboxylic acid, anhydrides of these acids, and lower alkyl ester of these acids.

Examples of the polyhydric alcohol having three or more hydroxyl groups include glycerin, 2-methyl-1,2,3-propanetriol, 1,2,4-butanetriol, 2-methyl-1,2,4-butanetriol, 1,2,5-pentanetriol, pentaerythritol, dipentaerythritol, tripentaerythritol, hexitol, sorbitol, 1,4-sorbitan, and a 1,2,4-benzenetriol.

The polyester resin is synthesized by co-condensing the above-mentioned components at a temperature of 180 to 250° C. under an inert-gas atmosphere, for example.

The value of OHV/AV which is the ratio of the hydroxyl value (OHV) to the acid value (AV) of the polyester resin is not less than 1.2, preferably 1.2 to 5.0, and more preferably 2 to 40. If the value of OHV/AV is less than 1.2, the light-transmittable properties of the resin are reduced, and the minimum welding temperature of the resin is increased, so that a continuous coating film is not easy to form by welding by heating, and the flowability of the powder coating is reduced.

The acid value (AV) of the polyester resin is calculated from its amount of neutralization upon melting the polyester resin in a benzene-ethanol mixed solvent and titrating the resin using potassium hydroxide. The hydroxyl value (OHV) of the polyester resin is calculated from its amount of neutralization upon acetylating a free acid in the polyester resin using a pyridine-acetic anhydride mixed solvent (3.1:1), for example, and then titrating acetate bonded to the resin using potassium hydroxide.

The above-mentioned polyester resin can be used alone. In addition thereto, various types of conventionally known resins, as described above, may be blended. When the other resin is blended, the amount of mixture thereof is preferably 1 to 30% by weight of the polyester resin.

Coloring Agent

As a cyan (C) coloring agent, particularly a phthalocyanine pigment is suitably used. A specific example of such a phthalocyanine pigment is a copper phthalocyanine pigment expressed by the following general formula (2):

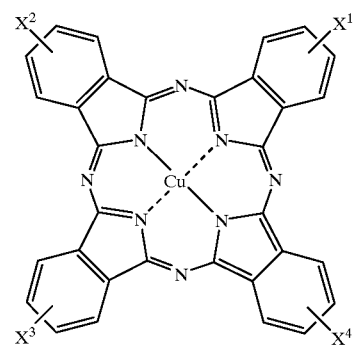

[wherein $X^1$, $X^2$, $X^3$ and $X^4$ are the same or different and indicate a hydrogen atom, a group (2a) or a group (2b):

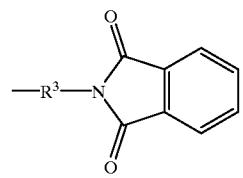

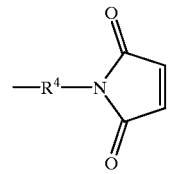

wherein $R^3$ and $R^4$ indicate an alkylene group having one to five carbon atoms].

Examples of the copper phthalocyanine pigment is C.I. pigment blue 15 (15:1 to 15:4) [a compound in which $X^1$, $X^2$, $X^3$ and $X^4$ are all hydrogen atoms] in classification based on a color index or its derivative. Examples of the derivative of C.I. pigment blue 15 include its partial chlorinated compound or barium salt of sulfonic acid of the C.I. pigment blue 15 (C.I. pigment blue 17).

Also sppecific example of such a phthalocyanine pigment is a metal-free phthalocyanine pigment (C.I. pigment blue 16) expressed by the following formula (3):

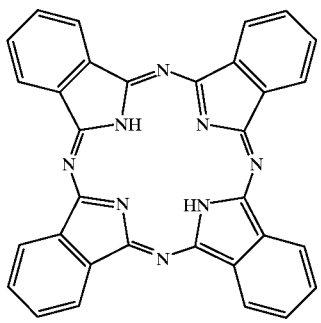

Examples of the cyan coloring agent other than the foregoing include inorganic pigments such as Prussian blue and cobalt blue, organic pigments such as C.I. pigment blue 18 and C.I. pigment blue 16, and dyes such as C.I. bat blue 6, and C.I. solvent blue 70.

The amount of mixture of the cyan coloring agent is preferably approximately 1 to 20 parts by weight, and more preferably approximately 2 to 8 parts by weight per 100 parts by weight of the binder resin when it is considered that a brilliant color is obtained and the light-transmittable properties of the powder coating are not reduced in the case of the cyan (C) powder coating.

On the other hand, the amount of mixture of the cyan coloring agent is preferably approximately 0.1 to 2.5 parts by weight, and more preferably 0.5 to 2.0 parts by weight per 100 parts by weight of the binder resin depending on the strength of color of the cyan powder coating to be combined when it is considered that the color tone is improved and the coating film is prevented from being given appearance of grain, described above, in the case of the light cyan (LC) powder coating.

As the magenta (M) coloring agent, a quinacridone pigment, for example, is used. A specific example of the quinacridone pigment is a compound expressed by the following general formula (4):

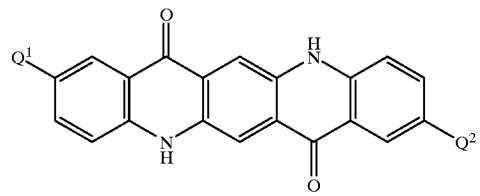

(4)

[wherein $Q^1$ and $Q^2$ are the same or different and indicate a hydrogen atom, an alkyl group or an alkoxyl group, where $Q^1$ and $Q^2$ are not simultaneously hydrogen atoms].

An example is C.I. pigment red 122 [a compound in which both $Q^1$ and $Q^2$ are methyl groups].

Examples of the magenta coloring agent other than the foregoing include inorganic pigments such as red iron oxide, cadmium red, red lead, mercury sulfide cadmium, manganese violet, chrome orange, and molybdenum orange, organic pigments such as C.I. pigment red 3, C.I. pigment red 38, C.I. pigment red 48 2, C.I. pigment red 49 : 1, C.I. pigment red 49 : 2, C.I. pigment red 50, C.I. pigment red 57, C.I. pigment red 60, C.I. pigment red 81, C.I. pigment red 90, permanent red FNG, C.I. pigment violet 3, C.I. pigment violet 25, C.I. pigment orange 5, C.I. pigment orange 13, and C.I. pigment orange 16, and dyes such as spiron red, indanthrene brilliant orange RK, and indanthrene brilliant orange GK.

The amount of mixture of the magenta coloring agent is preferably approximately 1 to 20 parts by weight, and more preferably approximately 2 to 8 parts by weight per 100 parts by weight of the binder resin when it is considered that a brilliant color is obtained and the light-transmittable properties of the powder coating are not reduced in the case of the magenta (M) powder coating.

On the other hand, the amount of mixture of the magenta coloring agent is preferably approximately 0.1 to 2.5 parts by weight, and more preferably 0.5 to 2.0 parts by weight per 100 parts by weight of the binder resin depending on the color strength of the magenta powder coating to be combined when it is considered that the color tone is improved and the coating film is prevented from being given appearance of grain, described above, in the case of the light magenta (LM) powder coating.

Examples of the yellow (Y) coloring agent include a condensed azo pigment, an isoindoline pigment, or a benzimidazolone pigment.

An example of the condensed azo pigment out of the foregoing is a compound expressed by the following general formula (5):

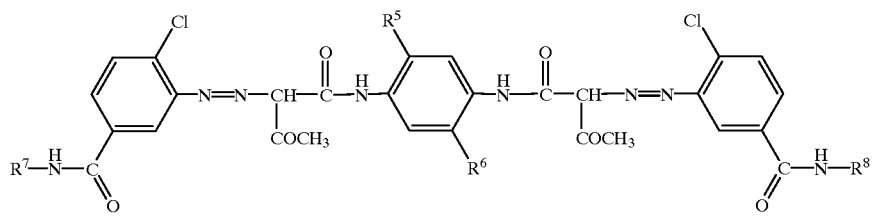

(5)

[wherein $R^5$ and $R^6$ are the same or different and indicate an alkyl group or a halogen atom, and $R^7$ and $R^8$ are the same or different and indicate a group expressed by the following formula (5a) or (5b):

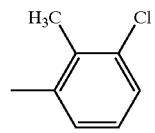

(5a)

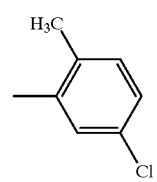

(5b)

Examples are C.I. pigment yellow 93 [a compound in which $R^5$ is a methyl group, $R^6$ is a chlorine group, and both $R^7$ and $R^8$ are the groups (5a)], C.I. pigment yellow 94 [a compound in which both $R^5$ and $R^6$ are chlorine atoms, and both $R^7$ and $R^8$ are the groups (5b)], and C.I. pigment yellow 95 [a compound in which both $R^5$ and $R^6$ are methyl groups, and both $R^7$ and $R^8$ are the groups (5b)].

An example of the isoindoline pigment is a compound expressed by the following general formula (6):

(6)

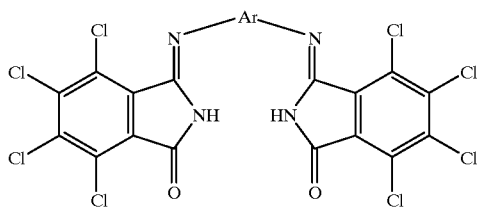

[wherein Ar is a group expressed by the following formula (6a) or (6b):

(6a)

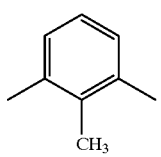

(6b)

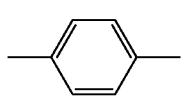

Examples are C.I. pigment yellow 109 [a compound in which Ar is the group (6a)], and C.I. pigment yellow 110 [a compound in which Ar is the group (6b)].

An example of the benzimidazolone pigment is a compound (C.I. pigment yellow 154) expressed by the following formula (7):

(7)

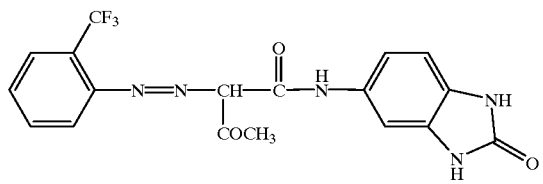

Examples of the yellow coloring agent other than the foregoing include inorganic pigments such as yellow iron oxide, yellow ochre, chrome yellow, zinc yellow, cadmium yellow, and antimony yellow, organic pigments such as C.I. pigment yellow 1, C.I. pigment yellow 3, C.I. pigment yellow 12, C.I. pigment yellow 13, C.I. pigment yellow 16, C.I. pigment yellow 17, C.I. pigment yellow 55, C.I. pigment yellow 65, C.I. pigment yellow 73, C.I. pigment yellow 74, C.I. pigment yellow 83, C.I. pigment yellow 97, C.I. pigment yellow 98, C.I. pigment yellow 115, C.I. pigment yellow 130, C.I. pigment yellow 133, C.I. pigment yellow 138, and C.I. pigment yellow 169, and dyes such as C.I. solvent yellow 16, C.I. solvent yellow 33, C.I. solvent yellow 56, C.I. solvent yellow 60, C.I. solvent yellow 61, C.I. solvent yellow 162, C.I. acid yellow 1, and C.I. acid yellow 23.

The amount of mixture of the yellow coloring agent is preferably approximately 1 to 20 parts by weight, and more preferably approximately 1.5 to 8 parts by weight per 100 parts by weight of the binder resin when it is considered that a brilliant color is obtained and the light-transmittable properties of the powder coating are not reduced.

As the red (R) coloring agent, a naphthol pigment, for example, is used. A specific example of such a naphthol pigment include a compound (C.I. pigment red 170) expressed by the following general formula (8):

(8)

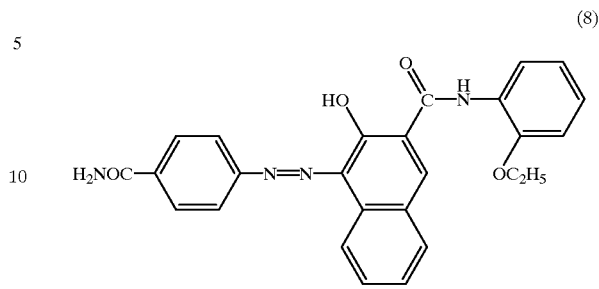

Examples of the red coloring agent other than the foregoing include organic pigments such as C.I. pigment red 5, C.I. pigment red 146, C.I. pigment red 177, C.I. pigment red 178, C.I. pigment red 202, C.I. pigment red 238, C.I. pigment red 251, C.I. pigment red 254, C.I. pigment red 255, and C.I. pigment red 264.

The amount of mixture of the red coloring agent is preferably approximately 1 to 20 parts by weight, and more preferably approximately 2 to 8 parts by weight per 100 parts by the binder resin when it is considered that a brilliant color is obtained and the light-transmittable properties of the powder coating are not reduced in the case of the red (R) powder coating.

On the other hand, the amount of mixture of the red coloring agent is preferably approximately 0.1 to 2.5 parts by weight, and more preferably 0.5 to 2.0 parts by weight per 100 parts by weight of the binder resin depending on the strength of color of the red powder coating to be combined when it is considered that the color tone is improved and the coating film is prevented from being given appearance of grain, described above, in the case of the light red (LR) powder coating.

The colorless (T) powder coating is produced without adding the above-mentioned coloring agents.

(Other Additives)

Examples of additives other than the coloring agents include various types of conventionally known additives such as a charge controlling agent, a curing agent, and a smoothing agent (flowing agent).

The charge controlling agent out of the foregoing is for improving, when the powder coating is used for the above-mentioned coating method by electrostatic adhesion, for example, an electrostatic coating method using a spray gun or an electrostatic powder fluid bed coating method, the charging amount thereof and stabilizing the charging amount irrespective of changes in environmental conditions such as temperature and humidity as well as matching the chargeabilities of the powder coatings in the respective colors, as described above. Either one of a positive charge controlling agent and a negative charge controlling agent is used depending on the charging polarity of the powder coating.

Examples of the positive charge controlling agent out of the foregoing include a nigrosine electron donative dye, metal salt of naphthenic acid or higher fatty acid, alkoxylated amine, quaternary ammonium salt, alkyl amide, chelate, pigment, and fluorine treatment activator.

Examples of the negative charge controlling agent include an electron acceptive organic complex, chlorinated paraffin, chlorinated polyester, excessive acid radical polyester, sulfonyl amine of copper phthalocyanine, aromatic oxycarboxylic acid, and aromatic dicarboxylic acid.

In the light-transmittable powder coating, however, a charge controlling agent satisfying the following conditions is used in order to exert as little effect on the color thereof as possible:

(a) It is colorless or light, and
(b) It is superior in compatibility with a binder resin, or is superior in dispersion properties, in order not to make the powder coating cloudy.

An example of the positive charge controlling agent satisfying such conditions is the quaternary ammonium salt out of the foregoing. An example of the negative charge controlling agent is the aromatic oxycarboxylic acid and the aromatic dicarboxylic acid.

As the quaternary ammonium salt which is the positive charge controlling agent out of the foregoing, various types of compounds are listed. Particularly, a compound expressed by the following general formula (9) is suitably used:

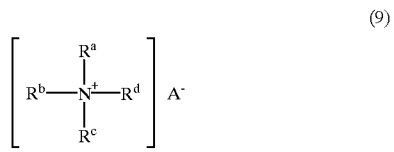

(9)

[wherein $R^a$, $R^b$, $R^c$ and $R^d$ are the same or different and indicate a lower alkyl group, a long-chain alkyl group, a long-chain alkenyl group or a benzyl group, and $A^-$ indicates an anion, where at least one of $R^a$ to $R^d$ is a long-chain alkyl group or a long-chain alkenyl group, and two of them are lower alkyl groups or benzyl groups].

Examples of the long-chain alkyl groups corresponding to $R^a$ to $R^d$ in the foregoing general formula (9) include an octyl group, a decyl group, a dodecyl group, a tetradecyl group, a hexadecyl group, an octadecyl group, an eicocyl group, a dodecyl group, an oleyl group, a linolyl group, and a hexadecyl group. Further, an example of the long-chain alkenyl group is a group having one or two or more double bonds introduced into a molecule of the long-chain alkyl group.

Examples of the anion indicated by $A^-$ include anions derived from inorganic acids, containing a molybdenum atom or a tungsten atom, such as molybdic acid, phosphomolybdic acid, silicomolybdic acid, chromium molybdic acid, bromine molybdic acid, tungstic acid, phosphotungstic acid, silicotungstic acid, chromium tungstic acid, bromine tungstic acid, phosphotungstomolybdic acid, and silicotungstomolybdic acid, a chlorine ion, a bromine ion, an iodine ion, a nitrate ion, a sulfate ion, a perchlorate ion, a benzoate ion, a tetraphenylborate ion, a hexafluorophosphorous ion, and a naphthol sulfonate ion. Specific examples of the quaternary ammonium salt expressed by the foregoing general formula (9) include:

$(C_{16}H_{33})_2N^+(CH_3)_2 \cdot \frac{1}{4}Mo_8O_{26}^{4-}$,
$(C_{16}H_{33})_2N^+(CH_3)_2 \cdot \frac{1}{6}Mo_7O_{24}^{6-}$, and
$(C_{16}H_{33})_2N^+(CH_3)_2 \cdot \frac{1}{2}WO_4^{2-}$.

They can be used alone or in combination of plural types. The amount of mixture of the charge controlling agent is preferably 1 to 10 parts by weight and more preferably 1 to 5 parts by weight per 100 parts by weight of a binder resin. When the amount of mixture of the charge controlling agent is less than the above-mentioned range, the adding effect may be insufficient. On the contrary, when it exceeds the above-mentioned range, the light-transmittable properties may be reduced, and the color may be changed.

The curing agent is for curing, when the powder coating is welded by heating to form a coating film, the coating film by bridging a binder resin in the coating film. Examples of such a curing agent include block isocyanate, epoxy resin, aminoresin, an aziridine compound, and polycarboxylic acid.

The range of a suitable amount of mixture of the curing agent is set depending on an equivalent amount of a functional group contributing to curing reaction. When the amount of mixture of the curing agent is less than a suitable range, the adding effect may be insufficient. Contrary to this, when it exceeds the suitable range, the light-transmittable properties maybe reduced, and the color may be changed.

The smoothing agent is for improving flowability in welding the powder coating by heating to further smooth the coating film. Examples of such a smoothing agent include "Acronal 4F (trade name) produced by BASF AG, "YF-3919 (trade name) produced by Toshiba Silicone Co., Ltd., and "Modaflow 2000 (trade name) produced by Monsanto Co.

The amount of mixture of the smoothing agent is preferably 0.1 to 2 parts by weight and more preferably 0.5 to 1 parts by weight per 100 parts by weight of a binder resin. When the amount of mixture of the smoothing agent is less than the above-mentioned range, the adding effect may be insufficient. On the contrary, when it exceeds the above-mentioned range, the light-transmittable properties may be reduced, and the color may be changed.

In addition thereto, other additives such as a curing accelerator for assisting in curing reaction by the curing agent, an antifoaming agent, or epoxy resin for enhancing the corrosion resistance of the coating film may be blended with the powder coating.

Method of Producing Powder Coating

The powder coating is produced by a grinding method, that is, a method of welding and kneading, using a jet mill, a Banbury mixer, a roll, a uniaxial or biaxial extruding kneader, a mixture obtained by preliminarily blending the above-mentioned components using a dry-blender, a Henschel mixer, a ball mill, or the like, then cooling and grinding a kneaded mixture obtained, and further classifying the mixture as required, as described above. Further, it can be also produced using a polymerization method, a microcapsule polymerization method, a spray drying method, or the like.

The particle size of the powder coating may be approximately the same as the conventional particle size. When consideration is given to color uniformity in mixing two or more colors, however, the smaller particle size is preferable. Particularly, the average particle size is preferably not more than 30 μm.

When consideration is given to chargeability, facility for forming a coating film, and difficulty in aggregation, it is preferable that the average particle size of the powder coating is particularly not less than 1 um in the above-mentioned range.

Furthermore, when consideration is given to a balance among the above-mentioned properties, it is particularly preferable that the average particle size of the powder coating is 5 to 20 μm in the above-mentioned range.

Various types of surface treating agents may be added to the powder coating in order to improve the flowability, the chargeability, and so forth as well as matching the chargeabilities of the powder coatings in the respective colors, as described above.

As the surface treating agents, it is possible to use various types of conventionally known surface treating agents having a particle size of not more than approximately 1.0 μm, for example, fine powder of metal oxides such as aluminum oxide, silicon oxide, titanium oxide, and zinc oxide, or particles of fluororesin. Particularly, a silica surface treating agent containing hydrophobic or hydrophilic silica fine particles, for example, a ultrafine particulate silica anhydride and colloidal silica are suitably used.

The amount of addition of the surface treating agent is not particularly limited, and may be approximately the same as the conventional amount. Specifically, it is preferable that the total amount of addition of the surface treating agent is approximately 0.1 to 3.0 parts by weight per 100 parts by weight of the powder coating. The amount of addition of the surface treating agent may depart from the range, as the case may be.

Formation of Coating Film

Since the powder coating color-matched by the above-mentioned color-matching method according to the present invention has light-transmittable properties, it is preferable that a layer of such a light-transmittable powder coating (a finish coating film) is generally formed on a metal to be coated with an undercoating film which has covering properties and particularly is white interposed therebetween in order to reproduce accurate color appearance of the color-matched powder coating depending on the color of the material to be coated.

In the case, it is proper that the undercoating film is formed of the powder coating, similarly to the finish coating film, in consideration of the effect on the safety and the environment, for example.

Various methods of laminating on the material to be coated both the undercoating film and the finish coating film which are formed of the powder coatings, as described above, are considered. When consideration is given to simplicity of the producing steps, labor saving of the production line, and so forth, however, a method of making the powder coating which forms the basis of the undercoating film and the powder coating which forms the basis of the finish coating film electrostatically adhere in this order on the material to be coated, and heating the powder coatings, together with the material to be coated, to form both the coating films at one time (a two coat and one bake method) is ideally employed.

In order to carry out such a two coat and one bake method, it is necessary to make the powder coating which forms the basis of the undercoating film electrostatically adhere on the material to be coated which is grounded in a state where it is charged to a predetermined polarity, and then make the powder coating which forms the basis of the finish coating film electrostatically adhere thereon in a state where it is charged to a polarity opposite to the above-mentioned polarity. The reason for this is that when the powder coatings which form the basis of both the coating films are charged to the same polarity, it is impossible to forma uniform finish coating film having a uniform thickness.

When a powder spray gun, for example, is used, the powder coating film which forms the basis of the undercoating film may be made to electrostatically adhere on the material to be coated in a state where it is positively charged using a triboelectrification gun, and the color-matched powder coating which forms the basis of the finish coating film may be then made to electrostatically adhere on the material to be coated in a state where it is negatively charged using a corona electrification gun. It is preferable that the powder coating which forms the basis of the undercoating film contains an inorganic pigment such as titanium oxide. When the powder coating containing the inorganic pigment is used, the shock resistance, the chemical resistance, and particularly the alkali resistance of the whole of the coating film obtained by the lamination are improved.

As described in detail in the foregoing, the present invention produces a characteristic function and effect of providing a new method of color-matching powder coatings in which a wide range of colors can be reproduced, and particularly colors which could not be conventionally reproduced, for example, light colors, transparent colors or brilliant colors can be reproduced.

Furthermore, according to the present invention, it is also possible to provide a coating method in which a superior coating film which is uniform in color development and superior in color reproducibility and has a smooth surface can be formed using the powder coatings color-matched by the color-matching method.

EXAMPLES

Preparation of Powder Coating

Cyan (C) Light-transmittable Powder Coating

The following components were blended using a Henschel mixer, were welded and kneaded using a biaxial kneader, were then ground using a jet mill, and were classified using an air current classifier, to produce a cyan light-transmittable powder coating having a volume center particle size of 13 μm.

| (Component) | (Parts by weight) |
|---|---|
| Binder resin | |
| polyester resin | 100 |
| [ER-6680 (trade name) produced by Nippon Ester Co., Ltd.] | |
| Pigment | |
| C.I. pigment blue 15:3 | 3.0 |
| Ket Blue 104 (trade name) produced by DAI NIPPON INK AND CHEMICALS, INC. | |
| Curing agent | |
| Bestagon B1530 (trade name) produced by Hüls Aktiengesellschaft | |
| Curing accelerator | |
| StannOMF (trade name) produced by Sankyo Yuki Gosei K.K. | 0.3 |
| Smoothing agent | |
| Disparlon PL525 (trade name) produced by Kusumoto Kasei K.K. | 1.0 |
| Antifoaming agent | |
| Benzoin (trade name) produced by Midori Kagaku K.K. | 0.5 |
| Epoxy resin | |
| [Epo-Tohto YD-014 (trade name) produced by Toto Kasei K.K.] | 2.0 |

The produced cyan light-transmittable powder coating was used for color-matching after agitating and blending 0.4 parts by weight of finely powdered silica [R972 (trade name) produced by Nippon Aerozil K.K.] serving as a surface treating agent for negative charging per 100 parts by weight of the powder coating using a rotary vane type mixer (COMMERCIAL BLENDER HGB-SS manufactured by WARING K.K.].

<Magenta (M) Light-transmittable Powder Coating>

A magenta light-transmittable powder coating having a volume center particle size of 13 μm was produced in the same manner as the cyan light-transmittable powder coating except that C.I. pigment blue 15:3 was replaced with the same amount (3.0 parts by weight) of C.I. pigment red 122 [Ket Red 309 (trade name) produced by DAI NIPPON INK AND CHEMICALS, INC.] as a pigment. The magenta light-transmittable powder coating was used for color-matching after agitating and blending 0.4 parts by weight of finely powdered silica [the above-mentioned R972] per 100 parts by weight of the powder coating using the above-mentioned rotary vane type mixer.

<Yellow (Y) Light-transmittable Powder Coating>

A yellow light-transmittable powder coating having a volume center particle size of 13 μm was produced in the same manner as the cyan light-transmittable powder coating except that C.I. pigment blue 15:3 was replaced with the same amount (3.0 parts by weight)of C.I. pigment yellow 154 [Symuler Fast Yellow 4192 (trade name) produced by Chiba-Geigy Ltd.] as a pigment. The yellow light-transmittable powder coating was used for color-matching after agitating and blending 0.4 parts by weight of finely powdered silica [the above-mentioned R972] per 100 parts by weight of the powder coating using the above-mentioned rotary vane type mixer.

<Red (R) Light-transmittable Powder Coating>

A red light-transmittable powder coating having a volume center particle size of 13 μm was produced in the same manner as the cyan light-transmittable powder coating except that C.I. pigment blue 15:3 was replaced with the same amount (3.0 parts by weight) of C.I. pigment red 170 [Brilliant Carmine 7009 (trade name) produced by Sanyo Sikiso K.K.] as a pigment. The red light-transmittable powder coating was used for color-matching after agitating and blending 0.4 parts by weight of finely powdered silica [the above-mentioned R972] per 100 parts by weight of the powder coating using the above-mentioned rotary vane type mixer.

<Colorless (T) Light-transmittable Powder Coating>

A colorless light-transmittable powder coating having a volume center particle size of 13 μm was produced in the same manner as the cyan light-transmittable powder coating except that no pigment was blended. The colorless light-transmittable powder coating was used for color-matching after agitating and blending 0.4 parts by weight of finely powdered silica [the above-mentioned R972] per 100 parts by weight of the powder coating using the above-mentioned rotary vane type mixer.

<<Production of Basic Data>>

21 samples of powder coatings each obtained by blending powder coatings in respective colors C, M, Y and T produced in the above-mentioned preparation of powder coatings at a blending ratio (% by weight) respectively shown in the following Table 1 and dryblended powder coating was made to electrostatically adhere under the following conditions II on a white powder coating which had been previously made to electrostatically adhere under the following conditions I on one surface of an SPCC steel plate serving as a material to be coated, and were then baked at a temperature of 180° C. for twenty minutes, to produce samples of coating films each having a two-layer structure of a white undercoating layer having a thickness of approximately 30 μm and a colored finish coating layer having an approximately 30 μm which is composed of each of the samples of powder coatings:

TABLE 1

| | | Sample No. | | | | | | |
|---|---|---|---|---|---|---|---|---|
| | | 1 | 2 | 3 | 4 | 5 | 6 | 7 |
| Weight % | C | 1 | 3 | 10 | 30 | 60 | 100 | 0 |
| | M | 0 | 0 | 0 | 0 | 0 | 0 | 1 |
| | Y | 0 | 0 | 0 | 0 | 0 | 0 | 0 |
| | T | 99 | 97 | 90 | 70 | 40 | 0 | 99 |

TABLE 1-continued

| | | Sample No. | | | | | | |
|---|---|---|---|---|---|---|---|---|
| | | 8 | 9 | 10 | 11 | 12 | 13 | 14 |
| Weight % | C | 0 | 0 | 0 | 0 | 0 | 0 | 0 |
| | M | 3 | 10 | 30 | 60 | 100 | 0 | 0 |
| | Y | 0 | 0 | 0 | 0 | 0 | 1 | 3 |
| | T | 97 | 90 | 70 | 40 | 0 | 99 | 97 |

| | | Sample No. | | | | | | |
|---|---|---|---|---|---|---|---|---|
| | | 15 | 16 | 17 | 18 | 19 | 20 | 21 |
| Weight % | C | 0 | 0 | 0 | 0 | 1 | 10 | 33.3 |
| | M | 0 | 0 | 0 | 0 | 1 | 10 | 33.3 |
| | Y | 10 | 30 | 60 | 100 | 1 | 10 | 33.3 |
| | T | 90 | 70 | 40 | 0 | 97 | 70 | 0 |

<Condition I (Coating of White Undercoating Layer)>

Feed of powder: quantitative feeder [trial machine manufactured by Mita Industrial Co., Ltd.], the number of revolutions=380 r.p.m., scraper angle=scale 1

Conveyance speed of material to be coated: 50 mm/sec.

Coater: manufactured by Nihon Parkerizing Co., Ltd., INF pressure=3 kg/cm$^2$G, turning pressure=3 kg/cm$^2$G, conveyance pressure=3 kg/cm$^2$G Gun: triboelectrification gun, nozzle=fan shape Booth suction wind speed: 0.59 m/sec.

Coating distance: 300 mm

Coating amount: 0.7 g

<Conditions II (Coating of Colored Finish Coating Layer)>

Feed of powder: the same as above

Conveyance speed of material to be coated: the same as above

Coater: the same as above

Gun: corona electrification gun, applied voltage=60 kV

Booth suction wind speed: the same as above

Coating distance: the same as above

Amount of coating: 0.5 g

The colors of the respective samples of coating films were then measured using a spectrophotometer [X-Rite SP68 produced by Kurabo Industries, Ltd.] serving as a color measuring machine, to produce 21 basic data (wavelength-reflectance curves). The 21 basic data were inputted to an operating device, to calculate respective K/S values [(K/S)$_1$ to (K/S)$_{21}$]. Calculated reflectance was then calculated from the K/S values, and tristimulus values were calculated from the calculated reflectance.

The following were used as the white powder coating for a white undercoating layer:

<White Powder Coating>

A white powder coating having a volume center particle size of 17 μm was produced in the same manner as the cyan light-transmittable powder coating (I) except that C.I. pigment blue 15:3 was replaced with the same amount of titanium oxide [CR-90 (trade name) produced by Ishihara Tekuno K.K.], and its components were not classified after being ground. The white powder coating was used for undercoating without being subjected to surface treatment.

<<Color-matching of Powder Coating I>>

Two colors, i.e., CF0245 (vivid green) and CF0461 (purple) were selected in a color card produced by Toyo Ink Mfg. Co., Ltd. as target colors, and each of them was measured using the above-mentioned spectrophotometer, to produce a wavelength-reflectance curve.

The wavelength-reflectance curve was inputted to a computer in which programs for executing the above-mentioned automatic color-matching system were set to calculate a K/S value, isomeric matching was performed using the K/S value and the calculated reflectance obtained in the previous production of basic data which had been previously recorded on a storage device of the computer, and metameric matching was then performed using the results of the isomeric matching and the tristimulus values obtained in the previous production of basic data which had been also previously recorded on the storage device, to calculate the blending ratio (% by weight) of the powder coatings in the four colors C, M, Y and T required to reproduce each of the above-mentioned target colors.

The results were respectively shown in Table 2 and Table 3.

TABLE 2

Target color: CF0245 (vivid green)

| Powder coating | % by weight |
| --- | --- |
| C | 3.50 |
| M | 0 |
| Y | 46.85 |
| T | 49.65 |

TABLE 3

Target color: CF0461 (purple)

| Powder coating | % by weight |
| --- | --- |
| C | 12.10 |
| M | 24.31 |
| Y | 2.39 |
| T | 61.19 |

<<Evaluation of Color-matching I>>

The powder coatings in the four colors C, M, Y and T were weighed using a weighting machine on the basis of the results in the foregoing Table 2 and Table 3, and were dryblended for 25 seconds upon being fed to the above-mentioned rotary vane type mixer serving as a mixer.

Each of the color-matched powder coating was then made to electrostatically adhere under the foregoing conditions II on the white powder coating which had been previously made to electrostatically adhere under the foregoing conditions I on one surface of an SPCC steel plate serving as a material to be coated, and was then baked at a temperature of 180° C. for twenty minutes, to produce a coating film, having a total thickness of 65 μm, having a two-layer structure of a white undercoating layer having a thickness of 30 to 35 μm and a colored finish coating layer having a thickness of 30 to 35 μm which is composed of each of the powder coatings.

The color of each of the coating films was measured using the above-mentioned spectrophotometer, to calculate a color difference ΔE* between data obtained by measuring the color and data obtained by measuring the target color in the color card. It was estimated that there was no delicate difference of color appearance (GOOD) when the color difference ΔE was not more than a threshold value 0.8, while there was a delicate difference of color appearance (BAD) when it exceeded 0.8. The results were shown in Table 4:

TABLE 4

| Target color | Color difference ΔE* | Judgment |
| --- | --- | --- |
| CF0245 (vivid green) | 0.78 | GOOD |
| CF0461 (purple) | 0.67 | GOOD |

From the Table 4, it was confirmed that each of the powder coatings color-matched using the four colors C, M, Y and T was satisfactorily color-matched because the color thereof hardly differs from the target color.

<<Color-matching of Powder Coating II>>

Colors, i.e., CF0381 (vivid blue), CF0071 (yellow red), and CF0461 (purple) were selected in the color card produced by Toyo Ink Mfg. Co., Ltd. as target colors, and each of them was measured using the above-mentioned spectrophotometer, to produce a wavelength-reflectance curve.

The wavelength-reflectance curve was inputted to a computer in which programs for executing the above-mentioned automatic color-matching system were set, to calculate a K/S value, isomeric matching was performed using the K/S value and the calculated reflectance obtained in the previous production of the basic data which had been previously recorded on a storage device of the computer, and metameric matching was performed using the results of the isomeric matching and the tristimulus values obtained in the previous production of basic data which had been also previously recorded on the storage device, to calculate the blending ratio (% by weight) of the powder coatings in the four colors C, M, Y and T required to reproduce each of the above-mentioned target colors.

For comparison, an attempt to reproduce the above-mentioned respective colors without using the colorless light-transmittable powder coating but using only the light-transmittable powder coatings in the three colors C, M and Y was made, and basic data required therefor were found, to calculate the blending ratio (% by weight) of the powder coatings in the three colors C, M and Y in the same manner as described above.

The results were respectively shown in Table 5 to 7:

TABLE 5

Target color: CF0381 (vivid blue)

| Powder coating | Four color system (% by weight) | Three color system (% by weight) |
| --- | --- | --- |
| C | 22.40 | 90.98 |
| M | 0 | 0 |
| Y | 2.22 | 9.02 |
| T | 75.38 | — |

TABLE 6

Target color: CF0071 (yellow red)

| Powder coating | Four color system (% by weight) | Three color system (% by weight) |
| --- | --- | --- |
| C | 0 | 0 |
| M | 17.24 | 75.65 |
| Y | 5.55 | 24.35 |
| T | 77.21 | — |

TABLE 7

Target color: CF0461 (purple)

| Powder coating | Four color system (% by weight) | Three color system (% by weight) |
| --- | --- | --- |
| C | 12.10 | 31.18 |
| M | 24.31 | 62.64 |
| Y | 2.40 | 6.18 |
| T | 61.19 | — |

<<Evaluation of Color-matching II>>

The powder coatings in the four colors C, M, Y and T or in the three colors C, M and Y were weighed using a weighing machine on the basis of the results in the foregoing Table 5 to Table 7, and were dryblended for 25 seconds upon being fed to the above-mentioned rotary vane type mixer serving as a mixer. Each of the color-matched powder coatings was then made to electrostatically adhere under the foregoing conditions of II on the white powder coating which had been previously made to electrostatically adhere under the foregoing conditions I on one surface of an SPCC steel plate serving as a material to be coated, and was then baked at a temperature of 180° C. for twenty minutes, to produce a coating film, having a total thickness of 65 μm, having a two-layer structure of a white undercoating layer having a thickness of 30 to 35 μm and a colored finish coating layer having a thickness of 30 to 35 μm which is composed of each of the powder coatings. The color of each of the coating films was measured using the above-mentioned spectrophotometer, to calculate a color difference ΔE* between data obtained by measuring the color and data obtained by measuring the target color in the color card. It was estimated that there was no delicate difference of color appearance (GOOD) when the color difference ΔE* was not more than a threshold value 0.8, while there was a delicate difference of color appearance (BAD) when it exceeded 0.8. The results were shown in Table 8:

TABLE 8

| Target color | Four color system of CMYT | | Three color system Of CMY | |
| --- | --- | --- | --- | --- |
| | Color difference ΔE* | Judgment | Color difference ΔE* | Judgement |
| CF0381 (vivid blue) | 0.54 | GOOD | 6.71 | BAD |
| CF0071 (yellow red) | 0.33 | GOOD | 4.22 | BAD |
| CF0461 (purple) | 0.67 | GOOD | 3.36 | BAD |

From the Table 8, it was confirmed that each of the powder coatings color-matched using the four colors C, M, Y and T was satisfactorily color-matched because the color thereof hardly differs from the target color, as compared with each of powder coatings color-matched using only three colors C, M and Y.

While the invention has been described in detail, the foregoing description is in all aspects illustrative and not restrictive. It is understood that numerous other modifications and variations can be devised without departing from the scope of the invention.

The disclosure of Japanese Patent Application Serial No.10-94741, filed on Apr. 7, 1998, is incorporated herein by reference.

What is claimed is:

1. A method of producing a color-matched powder coating, comprising the steps of:

providing at least one of a plurality of colored light-transmittable powder coatings which are colored by a coloring agent, and a colorless light-transmittable powder coating containing no coloring agent;

calculating a blending ratio of the colored powder coatings and the colorless powder coating;

weighing the colored powder coatings and the colorless powder coating on the basis of the calculating step; and dryblending the powder coatings using a mixer.

2. The color-matching method according to claim 1, further comprising the steps of:

calculating a K/S value which is the ratio of an absorption coefficient K and a scattering coefficient S of light from a wavelength-reflectance curve prepared by measuring a color which is a target for color-matching;

performing isomeric matching using the K/S value and calculated reflectance previously calculated from K/S values $[(K/S)_1 \sim (K/S)_n]$ of n pieces of basic data obtained by measuring the respective colors of the colored powder coatings and the colorless powder coating which are used for color-matching;

performing metameric matching using the results of the isomeric matching and tristimulus values calculated from the calculated reflectance, to calculate the blending ratio of the colored powder coatings and the colorless powder coating; and weighing and blending the powder coatings in the respective colors and the colorless powder coating on the basis of the results of the calculation.

3. The method according to claim 1, wherein the plurality of colored light-transmittable powder coatings includes three colors of powder coatings which are, cyan, magenta and yellow powder coatings.

4. The method according to claim 1, wherein the plurality of colored light-transmittable powder coatings includes three colors of powder coatings which are, cyan, red and yellow powder coatings.

5. The method according to claim 1, wherein the plurality of colored light-transmittable powder coatings includes five colors of powder coatings which are, cyan, light cyan, magenta, light magenta and yellow powder coatings.

6. The method according to claim 1, wherein the plurality of colored light-transmittable powder coatings includes five colors of powder coatings which are, cyan, light cyan, red, light red and yellow powder coatings.

* * * * *